(12) United States Patent
Higgins

(10) Patent No.: US 9,636,981 B2
(45) Date of Patent: *May 2, 2017

(54) SYSTEMS AND METHODS FOR ALTERING ONE OR MORE VEHICLE FUNCTIONS

(71) Applicant: Toyota Motor Engineering & Manufacturing North America, Inc., Erlanger, KY (US)

(72) Inventor: Christopher M. Higgins, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/965,234

(22) Filed: Dec. 10, 2015

(65) Prior Publication Data

US 2016/0144695 A1    May 26, 2016

Related U.S. Application Data

(63) Continuation of application No. 14/554,768, filed on Nov. 26, 2014, now Pat. No. 9,243,440.

(51) Int. Cl.
*B60J 7/05*    (2006.01)
*B60J 7/057*   (2006.01)
(Continued)

(52) U.S. Cl.
CPC ............ *B60J 7/057* (2013.01); *B60J 7/043* (2013.01); *B60Q 9/002* (2013.01); *B60Q 9/007* (2013.01);
(Continued)

(58) Field of Classification Search
CPC ............ B60J 7/057; E05F 15/40; B60Q 9/007
See application file for complete search history.

(56) References Cited

U.S. PATENT DOCUMENTS

| 4,848,499 A | 7/1989 | Martinet et al. |
| 4,897,642 A | 1/1990 | DiLullo et al. |

(Continued)

FOREIGN PATENT DOCUMENTS

| GB | 2505939 A | 3/2014 |
| GB | 2505949 A | 3/2014 |

OTHER PUBLICATIONS

"RanchCams: Barn Cameras, Horse Trailer Cameras, Wired/Wireless"; website <http://www.ranchcams.net/>; accessed Aug. 28, 2014.

(Continued)

*Primary Examiner* — Thomas Tarcza
*Assistant Examiner* — Alex C Dunn
(74) *Attorney, Agent, or Firm* — Dinsmore & Shohl LLP

(57) ABSTRACT

Systems for altering vehicle functions are provided. A system for altering a vehicle function includes one or more processors, one or more memory modules communicatively coupled to the one or more processors, and machine readable instructions stored in the one or more memory modules. When executed by the one or more processors, the machine readable instructions may cause the system to determine a presence of a roof mounted article on a vehicle and disable at least one movable roof member function in response to the determination. In some embodiments, in response to determining that the vehicle is proximate a structure and determining the presence of the vehicle mounted article on the vehicle, the system may generate a notification pertaining to the vehicle mounted article. In some embodiments, the system may provide navigation assistance based on the determination that the vehicle mounted article is present on the vehicle.

20 Claims, 2 Drawing Sheets

(51) Int. Cl.
  *E05F 15/73* (2015.01)
  *E05F 15/40* (2015.01)
  *B60J 7/043* (2006.01)
  *B60Q 9/00* (2006.01)
  *G01S 19/39* (2010.01)
  *G05D 1/00* (2006.01)
  *G05D 1/02* (2006.01)

(52) U.S. Cl.
  CPC .............. *E05F 15/40* (2015.01); *E05F 15/73* (2015.01); *G01S 19/39* (2013.01); *G05D 1/0088* (2013.01); *G05D 1/0278* (2013.01); *E05Y 2400/53* (2013.01); *E05Y 2900/542* (2013.01)

(56) References Cited

U.S. PATENT DOCUMENTS

| | | | |
|---|---|---|---|
| 7,579,940 B2 | 8/2009 | Schofield et al. | |
| 7,797,881 B2 * | 9/2010 | Loitherstein | E05F 15/74 340/932.2 |
| 7,798,263 B2 | 9/2010 | Tandy, Jr. et al. | |
| 8,068,019 B2 | 11/2011 | Bennie et al. | |
| 8,380,390 B2 | 2/2013 | Sy et al. | |
| 8,781,692 B2 | 7/2014 | Kormann | |
| 9,121,703 B1 * | 9/2015 | Droz | G01C 3/08 |
| 2007/0038338 A1 | 2/2007 | Larschan et al. | |
| 2009/0024310 A1 * | 1/2009 | Karrie | G01M 1/122 701/124 |
| 2009/0271078 A1 | 10/2009 | Dickinson | |
| 2010/0114437 A1 * | 5/2010 | Boss | B60K 28/08 701/48 |
| 2013/0041524 A1 | 2/2013 | Brey | |
| 2013/0076007 A1 | 3/2013 | Goode et al. | |
| 2013/0201316 A1 * | 8/2013 | Binder | H04L 67/12 348/77 |
| 2014/0005887 A1 | 1/2014 | Tippelhofer | |
| 2014/0307247 A1 * | 10/2014 | Zhu | G01S 17/023 356/4.01 |

OTHER PUBLICATIONS

Notice of Allowance mailed Sep. 14, 2015 for U.S. Appl. No. 14/554,768, filed Nov. 26, 2014.

* cited by examiner

SYSTEMS AND METHODS FOR ALTERING ONE OR MORE VEHICLE FUNCTIONS

CROSS-REFERENCE TO RELATED APPLICATIONS

This application is a continuation of U.S. patent application Ser. No. 14/554,768, filed on Nov. 26, 2014 and entitled "Systems and Methods for Altering One Or More Vehicle Functions."

TECHNICAL FIELD

Embodiments described herein generally relate to systems and methods for altering one or more vehicle functions and, more specifically, to systems and methods for altering one or more vehicle functions in response to the presence of one or more vehicle mounted articles.

BACKGROUND

Vehicle mounted articles can be positioned on a roof of a vehicle. It may be desirable to alter one or more functions of the vehicle based on the presence of vehicle mounted articles, for example, based on the increased height of the vehicle due to the presence of the vehicle mounted articles.

Accordingly, a need exists for systems and methods for altering one or more vehicle functions in response to the presence of one or more vehicle mounted articles on a roof of a vehicle.

SUMMARY

In one embodiment, a system for altering a vehicle function includes one or more processors, one or more memory modules communicatively coupled to the one or more processors, and machine readable instructions stored in the one or more memory modules. When executed by the one or more processors, the machine readable instructions cause the system to determine a presence of a roof mounted article on a roof of a vehicle and disable at least one movable roof member function in response to the presence of the roof mounted article on the roof of the vehicle.

In another embodiment, a system for providing a notification pertaining to a vehicle includes one or more processors, one or more memory modules communicatively coupled to the one or more processors, and a satellite antenna communicatively coupled to the one or more processors. The satellite antenna receives a signal from one or more global positioning system satellites. Further, machine readable instructions are stored in the one or more memory modules. When executed by the one or processers, the machine readable instructions cause the system to transform the signal into a location of the vehicle, determine a presence of a vehicle mounted article on the vehicle, determine that the vehicle is proximate a structure having a passageway that includes a clearance height, and in response to determining that the vehicle is proximate the structure and determining the presence of the vehicle mounted article on the vehicle, generating a notification pertaining to the vehicle mounted article.

In yet another embodiment, a system for providing navigation assistance to a vehicle includes one or more processors, one or more memory modules communicatively coupled to the one or more processors, and a satellite antenna communicatively coupled to the one or more processors. The satellite antenna receives a signal from one or more global positioning system satellites. Further, machine readable instructions are stored in the one or more memory modules. When executed by the one or more processors, the machine readable instructions cause the system to transform the signal into a location of the vehicle, determine a presence of a vehicle mounted article on the vehicle, and provide navigation assistance based on the determination that the vehicle mounted article is present on the vehicle.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 2:
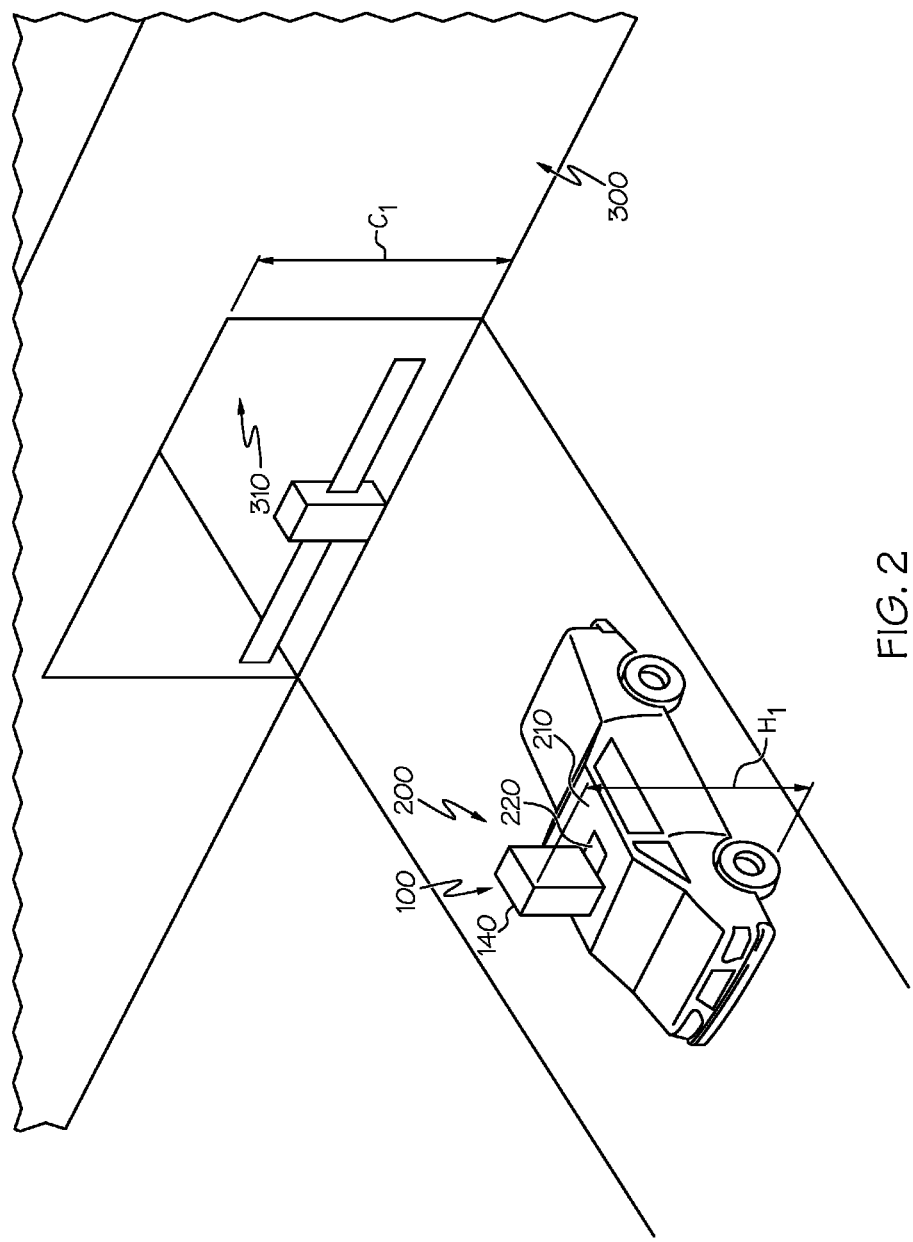
FIG. 2 schematically depicts a vehicle including the system positioned proximate a structure, according to one or more embodiments shown and described herein.

The embodiments disclosed herein include systems and vehicles for altering one or more vehicle functions based on a determination of the presence of one or more vehicle mounted articles on a roof of a vehicle. Referring generally to FIG. 2, the systems and vehicles provided herein determine the presence of one or more vehicle mounted articles using, for example, one or more sensing devices, inputs, hardware, or the like. Further, one or more characteristics of the one or more vehicle mounted articles may be determined, for example, dimensional characteristics. In response to the presence and, in some embodiments, the characteristics of the one or more vehicle mounted articles, one or more vehicle functions may be altered. For example, one or more functions of a moveable roof member may be altered, one or more notification functions may be altered, and navigation assistance may be provided by the systems and vehicles. The systems and methods may help to prevent the vehicle mounted article, for example, a roof mounted article, from contacting the moveable roof member and/or one or more structures. This may help prevent damage to the vehicle mounted article and the vehicle. The various systems and vehicles for altering one or more vehicle functions based on a determination of a presence of one or more vehicle mounted articles will be described in more detail herein with specific reference to the corresponding drawings.

Figure 1:
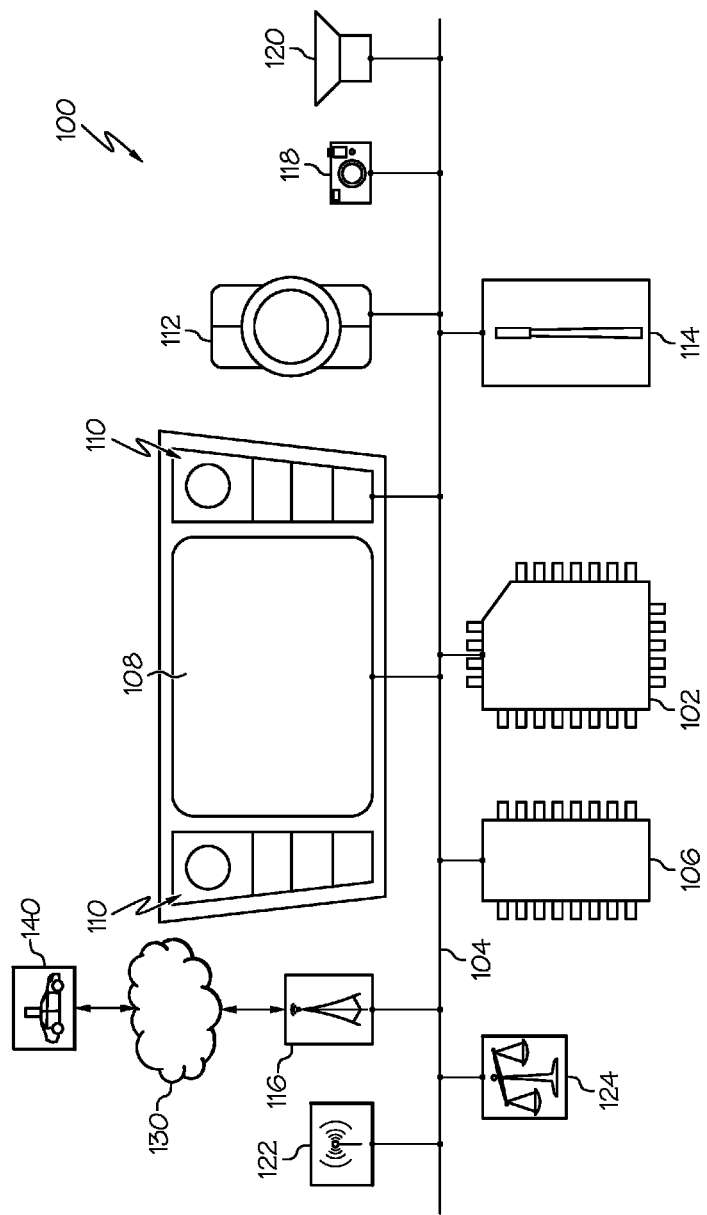
FIG. 1 schematically depicts a system, according to one or more embodiments shown and described herein.

Referring now to FIG. 1, an embodiment of a system 100 is schematically depicted. It is noted that, while the system 100 is depicted in isolation, the system 100 may be included within a vehicle 200 (FIG. 2) in some embodiments. In embodiments in which the system 100 is included within a vehicle 200, the vehicle 200 may be an automobile or any other passenger or non-passenger vehicle 200 such as, for example, a terrestrial, aquatic, and/or airborne vehicle. In some embodiments, the vehicle 200 is an autonomous vehicle that navigates its environment with limited human input or without human input. In some embodiments, the system 100 may be embedded within a mobile device (e.g., smartphone, laptop computer, etc.) carried by a driver of the vehicle 200.

The system 100 includes one or more processors 102. Each of the one or more processors 102 may be any device capable of executing machine readable instructions. Accordingly, each of the one or more processors 102 may be a controller, an integrated circuit, a microchip, a computer, or any other computing device. The one or more processors 102 are coupled to a communication path 104 that provides signal interconnectivity between various modules of the system. Accordingly, the communication path 104 may communicatively couple any number of processors 102 with one another, and allow the modules coupled to the communication path 104 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. In some embodiments, the communication path 104 may facilitate the transmission of wireless signals, such as WiFi, Bluetooth, and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The system 100 includes one or more memory modules 106 coupled to the communication path 104. The one or more memory modules 106 may comprise RAM, ROM, flash memories, hard drives, or any device capable of storing machine readable instructions such that the machine readable instructions can be accessed by the one or more processors 102. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 106. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In some embodiments, the one or more memory modules 106 may include a database that includes navigation information and/or map information. However, it should be understood that other embodiments may not include navigation information and/or map information.

Referring still to FIG. 1, the system 100 comprises a display 108 for providing visual output such as, for example, maps, navigation, entertainment, information, or a combination thereof. The display 108 is coupled to the communication path 104. Accordingly, the communication path 104 communicatively couples the display 108 to other modules of the system 100. The display 108 may include any medium capable of transmitting an optical output such as, for example, a cathode ray tube, light emitting diodes, a liquid crystal display, a plasma display, or the like. Moreover, the display 108 may be a touchscreen that, in addition to providing optical information, detects the presence and location of a tactile input upon a surface of or adjacent to the display. Accordingly, each display may receive mechanical input directly upon the optical output provided by the display. Additionally, it is noted that the display 108 can include at least one of the one or more processors 102 and the one or memory modules 106. While the system 100 includes a display 108 in the embodiment depicted in FIG. 1, the system 100 may not include a display 108 in other embodiments.

The depicted system 100 comprises tactile input hardware 110 coupled to the communication path 104 such that the communication path 104 communicatively couples the tactile input hardware 110 to other modules of the system 100. The tactile input hardware 110 may be any device capable of transforming mechanical, optical, or electrical signals into a data signal capable of being transmitted with the communication path 104. Specifically, the tactile input hardware 110 may include any number of movable objects that each transform physical motion into a data signal that can be transmitted to over the communication path 104 such as, for example, a button, a switch, a knob, a microphone or the like. In some embodiments, the display 108 and the tactile input hardware 110 are combined as a single module and operate as an audio head unit or an infotainment system. However, it is noted, that the display 108 and the tactile input hardware 110 may be separate from one another and operate as a single module by exchanging signals via the communication path 104. While the system 100 includes tactile input hardware 110 in the embodiment depicted in FIG. 1, the system 100 may not include tactile input hardware 110 in other embodiments, such as embodiments that do not include a display 108.

The system 100 optionally comprises a peripheral tactile input 112 coupled to the communication path 104 such that the communication path 104 communicatively couples the peripheral tactile input 112 to other modules of the system 100. For example, in one embodiment, the peripheral tactile input 112 is located in a vehicle console to provide an additional location for receiving input. The peripheral tactile input 112 operates in a manner substantially similar to the tactile input hardware 110, i.e., the peripheral tactile input 112 includes movable objects and transforms motion of the movable objects into a data signal that may be transmitted over the communication path 104.

The system 100 comprises a satellite antenna 114 coupled to the communication path 104 such that the communication path 104 communicatively couples the satellite antenna 114 to other modules of the system 100. The satellite antenna 114 is configured to receive signals from global positioning system satellites. Specifically, in one embodiment, the satellite antenna 114 includes one or more conductive elements that interact with electromagnetic signals transmitted by global positioning system satellites. The received signal is transformed into a data signal indicative of the location (e.g., latitude and longitude) of the satellite antenna 114 or an object positioned near the satellite antenna 114, by the one or more processors 102. Additionally, it is noted that the satellite antenna 114 may include at least one of the one or more processors 102 and the one or memory modules 106. In some embodiments, the system 100 does not include the satellite antenna 114.

Still referring to FIG. 1, in some embodiments, the system 100 may be communicatively coupled to a vehicle mounted article 140 (e.g., the vehicle mounted article 140 mounted on a vehicle 200 that includes the system 100, as shown in FIG. 2) by a network 130. In one embodiment, the network 130 is a personal area network that utilizes Bluetooth technology to communicatively couple the system 100 and the vehicle mounted article 140. In other embodiments, the network 130 may include one or more computer networks (e.g., a personal area network, a local area network, or a wide area network), cellular networks, satellite networks and/or a global positioning system and combinations thereof. Accordingly, the system 100 can be communicatively coupled to the network 130 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 1, the system 100 comprises network interface hardware 116 for communicatively coupling the system 100 to the vehicle mounted article 140. The network interface hardware 116 can be communicatively coupled to the communication path 104 and can be any device capable of transmitting and/or receiving data via a network. Accordingly, the network interface hardware 116 can include a communication transceiver for sending and/or receiving any wired or wireless communication. For example, the network interface hardware 116 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 116 includes hardware configured to operate in accordance with the Bluetooth wireless communication protocol. In another embodiment, network interface hardware 116 may include a Bluetooth send/receive module for sending and receiving Bluetooth communications to/from the vehicle mounted article 140. Some embodiments may not include the network interface hardware 116.

Still referring to FIG. 1, as stated above, the network 130 may be utilized to communicatively couple the system 100 with the vehicle mounted article 140. In some embodiments, the vehicle mounted article 140 is configured with wired and/or wireless communication functionality for communicating with the system 100, such as embodiments in which the vehicle mounted article 140 includes a communication transceiver for sending and/or receiving any wired or wireless communication. Referring also to FIG. 2, the vehicle mounted article 140 may comprise, for example, a roof mounted article such as one or more cargo items, roof-mounted storage pods, roof-mounted luggage, bicycles, watercraft, or the like. The roof mounted article may be removably attached to a roof 210 of the vehicle 200, for example, a top of the roof 210 of the vehicle 200. In some embodiments, the roof mounted article may be removably attached to one or more roof rails mounted on the roof 210 of the vehicle 200. In other embodiments, the vehicle mounted article 140 is mounted to another portion of the vehicle 200, such as, a front bumper, a rear bumper, and/or a bed of a vehicle 200, (e.g., the bed of a truck). In an example embodiment, the vehicle mounted article 140 is positioned on the bed of a truck and the vehicle mounted article 140 extends beyond the roof 210 of the vehicle 200.

Still referring to FIG. 1, the system 100 may further comprise a camera 118 coupled to the communication path 104 such that the communication path 104 communicatively couples the camera 118 to other modules of the system 100. The camera 118 may be any device having an array of sensing devices (e.g., pixels) capable of detecting radiation in an ultraviolet wavelength band, a visible light wavelength band, or an infrared wavelength band. The camera 118 may have any resolution. Some embodiments may not include the camera 118. Some embodiments may include multiple cameras 118. In operation, the camera 118 may be able to detect the presence of the vehicle mounted article 140. Further, the camera 118 may be able to determine one or more characteristics of the vehicle mounted article 140, such as, for example, the dimensions of the vehicle mounted article 140 (height, width, diameter, or the like). In some embodiments, the camera 118 may be able to determine a location of the vehicle 200, for example, by accessing geotagged data. Further, in some embodiments, the camera 118 may be able to determine one or more characteristics of one or more structures 300 (FIG. 2) proximate the vehicle 200, for example, dimensional characteristics.

Still referring to FIG. 1, the system 100 may further comprise a speaker 120 coupled to the communication path 104 such that the communication path 104 communicatively couples the speaker 120 to other modules of the system 100. The speaker 120 transforms data signals from the system 100 into audible mechanical vibrations. However, it should be understood that in other embodiments the system 100 may not include the speaker 120. In some embodiments, the speaker 120 may be configured to provide audible information regarding the vehicle mounted article 140, such as, for example, an alarm, a vocal message, or the like.

Still referring to FIG. 1, the system 100 may further comprise a proximity sensor 122 coupled to the communication path 104 such that the communication path 104 communicatively couples the proximity sensor 122 to other modules of the system 100. The proximity sensor 122 may be any device capable of outputting a proximity signal indicative of a proximity of an object to the proximity sensor 122. In some embodiments, the proximity sensor 122 may include a laser scanner, a capacitive displacement sensor, a Doppler effect sensor, an eddy-current sensor, an ultrasonic sensor, a magnetic sensor, an optical sensor, a radar sensor, a sonar sensor, or the like. Some embodiments may not include the proximity sensor 122. In some embodiments, the system 100 may be configured to determine the presence of a vehicle mounted article 140 on the roof 210 of the vehicle 200 based on an output signal outputted by the proximity sensor 122. In some embodiments, the system 100 may be able to determine one or more characteristics of the vehicle mounted article 140, such as, for example, the dimensions of the vehicle mounted article 140 (height, width, diameter, or the like) based on a proximity signal outputted by the proximity sensor 122. In some embodiments, the system 100 may be able to determine the location of the vehicle 200 based on a proximity signal outputted by the proximity sensor 122. Further, in some embodiments, the proximity sensor 122 may be able to determine one or more characteristics of one or more structures 300 (FIG. 2) proximate the vehicle 200, for example, dimensional characteristics, based on a proximity signal outputted by the proximity sensor 122.

Still referring to FIG. 1, the system 100 may further comprise a weight sensor 124 coupled to the communication path 104 such that the communication path 104 communicatively couples the weight sensor 124 to other modules of the system 100. The weight sensor 124 may be any device capable of outputting a weight signal indicative of a weight of an object sensed by the weight sensor 124. In some embodiments, the weight sensor 124 may comprise a load sensor, a force sensor, a weight pressure sensor, a mass sensor, or the like. In some embodiments, the weight sensor 124 may be configured to determine the weight of the vehicle mounted article 140 on the roof 210 of the vehicle 200. In some embodiments, the system 100 may be able to determine one or more characteristics of the vehicle mounted article 140, such as, for example, the weight of the vehicle mounted article 140 based on a weight signal outputted by the weight sensor 124.

Still referring to FIG. 1, the system 100 can be formed from a plurality of modular units, i.e., the display 108, tactile input hardware 110, the peripheral tactile input 112, and satellite antenna 114, can be formed as modules communicatively coupled form the system 100. Accordingly, in some embodiments, each of the modules can include at least one of the one or more processors 102 and/or the one or more memory modules 106. Accordingly, it is noted that, while specific modules may be described herein as including a processor 102 and/or a memory module 106, the embodiments described herein can be implemented with the processors 102 and memory modules 106 distributed throughout various communicatively coupled modules.

Referring now to FIGS. 1 and 2, the vehicle 200 may also include a movable roof member 220 such as a sunroof, a moonroof, or the like. The movable roof member 220 may be mechanically coupled to a movable roof member actuator that is coupled to the communication path 104. In some embodiments, the moveable roof member actuator may comprise a motor, or the like, mechanically coupled to the moveable roof member 220, for example, by a belt, a cable, or the like. The moveable roof member actuator may actuate the movable roof member 220 to perform one or more functions, for example, an outboard function and/or an inboard function.

During the outboard function, the moveable roof member actuator moves in a first direction to pull the belt or cable in the first direction to cause the moveable roof member to move in an outboard direction, i.e. above the roof 210 of the vehicle 200. The outboard function of the movable roof member 220 may be a tilt-up function or an outboard slide-open function. During the inboard function, the moveable roof member actuator moves in a second direction to pull the belt or cable in the second direction to cause the moveable roof member to move in an inboard direction, i.e., below the roof 210 of the vehicle 200, for example, into the cabin of the vehicle 200. The inboard function of the movable roof member 220 may be a tilt-down function or an inboard slide-open function.

Method of Altering a Vehicle Function

Still referring to FIGS. 1 and 2, the system 100 may implement a method of altering a vehicle function based on the presence of a roof mounted article (e.g., the vehicle mounted article 140 positioned on the roof of the vehicle 200, as shown in FIG. 2). In some embodiments, the method may be implemented as logic within the machine readable instructions that, when executed by the one or more processors 102, automatically provides vehicle function instruction. It is noted that, while the method is described as following a specific sequence, additional embodiments of the present disclosure are not limited to any particular sequence.

In operation, the system 100 first determines the presence of the roof mounted article. In some embodiments, the presence of the roof mounted article is determined based on an output from one or more sensing devices, such as, for example, the proximity sensor 122, the weight sensor 124, and/or the one or more cameras 118. In some embodiments, the system 100 may determine the presence of the roof mounted article based on a proximity signal output by the proximity sensor 122 when the proximity sensor 122 senses an object positioned within a threshold proximity distance from the proximity sensor 122. The threshold proximity distance may be a distance that is indicative of the distance between the proximity sensor 122 and the roof mounted article. In some embodiments, the threshold proximity distance is a distance large enough that any object positioned on the roof 210 of the vehicle 200 would be within the proximity distance. In some embodiments, the system 100 may determine the presence of the roof mounted article based on a weight signal output by the weight sensor 124 in response to sensing a weight at the roof mounted article, e.g., when a weight signal output by the weight sensor 124 exceeds a threshold weight. The threshold weight may be any weight measured by the weight sensor 124 that is indicative of an object positioned on the roof 210 of the vehicle 200, e.g., any non-negligible weight. In some embodiments, the system 100 may determine the presence of the roof mounted article based on one or more images output by the one or more cameras 118. In addition to determining the presence of the roof mounted article, the system 100 may further determine the type, weight, and or dimensions of the roof mounted article based on an output of the one or more sensing devices.

In some embodiments, the presence of the roof mounted article is determined based on user input. For example, the user may provide an input regarding the presence of the roof mounted article into the tactile input hardware 110, the peripheral tactile input 112, and/or the display 108. In some embodiments, the user input may be an audible input received by a microphone. The system 100 may determine from the user input that one or more roof mounted articles are present on the roof 210 of the vehicle 200 and, in some embodiments, the system 100 may determine particular information regarding the roof mounted article, for example, type, weight, and/or dimensions of the roof mounted article based on the user input. In some embodiments, the presence of the roof mounted article is determined based on communication received from network interface hardware of the roof mounted article by the network interface hardware 116. The communication received by the network interface hardware 116 may be indicative of the presence of a roof mounted article and, in some embodiments, may be indicative of the type, weight, and/or dimensions of the roof mounted article. In each of these embodiments, a data signal indicative of the presence of the roof mounted article is provided along the communication path 104.

When the system 100 determines that the roof mounted article is present on the roof 210 of the vehicle 200, the processor 102 disables at least one function of the movable roof member 220. In some embodiments, when the roof mounted article is determined to be present on the roof 210 of the vehicle 200, the outboard function of the movable roof member 220 may be disabled, preventing the movable roof member 220 from moving outboard the roof 210 of the vehicle 200. For example, disabling the outboard function of the moveable roof member 220 includes receiving an actuation signal indicative of a request to actuate the movable roof member 220 in an outboard direction and not actuating the moveable roof member actuator to move the movable roof member 220 in response to the received signal. Disabling the outboard function of the moveable roof member 220 may prevent the movable roof member 220 from contacting the roof mounted article.

In other embodiments, when the system 100 determines that the roof mounted article is present on the roof 210 of the vehicle 200, the processor 102 may disable the inboard function of the movable roof member 220 or all the functions of the movable roof member 220, for example, by not actuating the moveable roof member actuator to move the movable roof member 220 in an inboard direction or in any direction, in response to the received signal. In other embodiments, in response to the presence of the roof mounted article, the system 100 may operate to place the movable roof member 220 in a closed position, for example, by actuating the moveable roof member actuator to move the movable roof member 220 into a closed position. Further, the system 100 may repeat the steps of the method of altering a vehicle function based on the presence of the roof mounted article on the roof 210 of the vehicle 200, for example, after a predetermined time, upon starting the vehicle 200, in response to a user input, or a combination thereof. When the system 100 determines that no roof mounted article is present on the roof 210 of the vehicle 200, one or more functions of the movable roof member 220 may be unaltered.

Method of Providing a Notification Pertaining to a Vehicle

Referring again to FIGS. 1 and 2, a method of providing a notification pertaining to the vehicle 200 is also contemplated. The method of providing a notification pertaining to the vehicle 200 may be implemented as logic within the machine readable instructions that, when executed by the one or more processors 102, automatically provides notification. It is noted that, while the method is described as following a specific sequence, additional embodiments of the present disclosure are not limited to any particular sequence.

Referring still to FIGS. 1 and 2, the system 100 first determines a location of the vehicle 200. In operation, the satellite antenna 114 receives a satellite signal from one or more global positioning satellites. In some embodiments, the satellite antenna 114 receives the satellite signal with a conductive element. Next, the one or more processors 102 execute machine readable instructions to transform the satellite signals received by the satellite antenna 114 into a data signal indicative of a location of the system 100 (e.g., the current location at the time the satellite signal is received). In one embodiment, the data signal indicative of the location is capable of being transmitted over the communication path 104. For example, in some embodiments, the satellite antenna 114 includes a chipset that transforms the received satellite signal into a data signal that is transmitted over the communication path 104 and processed by the one or more processors 102. Generally, the data signal indicative of the location includes a latitude and a longitude. In some embodiments, the data signal indicative of the location includes an altitude.

In some embodiments, alternative methods of determining the location of the vehicle 200 are contemplated. For example, the location of the vehicle 200 can be determined based on an output from proximity sensor 122 and/or the camera 118. For example, the proximity sensor 122 may output proximity signals to the system 100 and the camera may be able to output images to the system 100 pertaining to the distance between the vehicle 200 and one or more points of interest, structures, waypoints, or the like. The location of these points of interest, structures, waypoints, or the like, may be stored in the one or more memory modules 106 and/or the system 100 may be able to access these locations, for example, through communication with one or more outside networks, servers, or the like. The system 100 may then determine the location of the vehicle 200 based on the proximity of the vehicle 200 to these points of interest, structures, waypoints, or the like.

Referring still to FIGS. 1 and 2, the system 100 next determines whether the vehicle mounted article 140 is present on the vehicle 200 using the methods described above with respect to determining whether the roof mounted article is present on the vehicle 200. For example, the system 100 may determine that the vehicle mounted article 140 is present based on an output from the proximity sensor 122, the weight sensor 124, the camera 118, roof mounted hardware of the vehicle mounted article 140, user input, or the like.

Next, the system 100 may determine a maximum vehicle height $H_1$. The maximum vehicle height $H_1$ may be the distance from a top of the vehicle mounted article 140 present on the vehicle 200 to a ground surface, for example, when the vehicle mounted article 140 positioned on the roof 210 of the vehicle 200 or when the vehicle mounted article 140 extends beyond the roof 210 of the vehicle 200. In some embodiments, the maximum vehicle height $H_1$ is the height of the vehicle 200, for example, when no vehicle mounted article 140 is present or when the vehicle mounted article 140 does not extend beyond the roof 210 of the vehicle 200.

To determine the maximum vehicle height $H_1$ of the vehicle 200, the proximity sensor 122 may output a proximity signal indicative of the height of a portion of the vehicle mounted article 140 extending beyond the roof 210 of the vehicle, a height of a roof mounted article, the height of the vehicle 200, and/or the distance from a top of the vehicle mounted article 140 to a ground surface. In some embodiments, the camera 118 may output an image of the vehicle mounted article 140 to the system 100 and the system 100 may be able to determine from that image, the height of a portion of the vehicle mounted article 140 extending beyond the roof 210 of the vehicle, a height of a roof mounted article, the height of the vehicle 200, and/or the distance from a top of the vehicle mounted article 140 to a ground surface.

In some embodiments, the network interface hardware of the vehicle mounted article 140 may output a signal to the system 100 communicating the height of a portion of the vehicle mounted article 140 extending beyond the roof 210 of the vehicle, a height of a roof mounted article, the height of the vehicle 200, and/or the distance from a top of the vehicle mounted article 140 to a ground surface. Further, the user may input the height of a portion of the vehicle mounted article 140 extending beyond the roof 210 of the vehicle 200, a height of a roof mounted article, the height of the vehicle 200, and/or the distance from a top of the vehicle mounted article 140 to a ground surface into the display 108, the tactile input hardware 110, and/or the peripheral tactile input 112. In some embodiments, a height of the vehicle 200 is stored in the one or more memory modules 106 such that when the system 100 determines the height of the vehicle mounted article 140 and/or the height of the portion of the vehicle mounted article 140 extending beyond the roof 210 of the vehicle 200, using any of the methods described above, the system 100 may also determine the maximum vehicle height $H_1$ of the vehicle 200. For example, in some embodiments, the system 100 may determine the maximum vehicle height $H_1$ of the vehicle 200 with the vehicle mounted article 140 by adding the height of the vehicle 200 stored in the one or more memory modules 106 and a height of the portion of the vehicle mounted article 140 extending beyond the roof 210 of the vehicle 200 determined based on an output from the one or more sensing devices, a communication received from the vehicle mounted article 140, and/or a user input.

Referring still to FIGS. 1 and 2, the system 100 next determines whether the vehicle 200 is proximate a structure 300 having a passageway 310. In operation, the machine readable instructions stored in the one or more memory modules 106, when executed by the one or more processors 102, cause the system 100 to identify, automatically, one or more points of interest having a passageway 310 from a list of points of interest. In some embodiments, the one or more points of interest are identified by accessing the points of interest list stored in the one or more memory modules 106, determining the distances between the location of the vehicle 200 and the location of each point of interest having a passageway 310 in the point of interest list, and identifying whether the vehicle 200 is proximate one or more point of interests having a passageway 310. By identifying the points of interest having a passageway 310 within a threshold distance from the system location, points of interest having a passageway 310 proximate the current location of the system 100 may be identified. For example, in some embodiments, the threshold distance may be 60 meters, such that all points of interest having a passageway 310 within 60 meters of the system location are identified. In other embodiments, the threshold distance may differ from 60 meters, such as embodiments in which the threshold distance is 200 meters, 100 meters, 30 meters, 10 meters, or the like.

Referring still to FIGS. 1 and 2, the one or more points of interest having a passageway 310 may comprise one or more structures 300 having at least one passageway 310 including a clearance height $C_1$, such as, for example, a parking garage, a bridge, a tunnel, or the like. In some embodiments, the clearance height $C_1$ may be, for example, about 2-3 meters, and in other embodiments, the clearance height $C_1$ may differ. In some embodiments, the proximity of the vehicle 200 to one or more structures 300 having at least one passageway 310 can be determined based on an output from one or more sensing devices of the system 100, for example, the proximity sensor 122 and/or one or more cameras 118.

Referring still to FIGS. 1 and 2, the machine readable instructions stored in the one or more memory modules 106, when executed by the one or more processors 102, cause the system 100 to generate a notification based on a comparison of the maximum vehicle height $H_1$ and the clearance height $C_1$. For example, in some embodiments, the system 100 generates a notification when the maximum vehicle height $H_1$ of the vehicle 200 differs from the clearance height $C_1$ by less than a threshold amount. The threshold amount may be 0.3 meters, such that when the maximum vehicle height $H_1$ and the clearance height $C_1$ is less than or equal to 0.3 meters, a notification is generated. In other embodiments, the threshold amount may differ from 0.3 meters, such as embodiments in which the threshold amount is 2 meters, 1 meter, 0.5 meters, 0.1 meters, or the like. In some embodiments, the notification is an audible notification provided through the speaker 120. In some embodiments, the notification is a visual notification provided on a display 108. The notification may alert the driver of the vehicle 200 that a collision between, for example, the vehicle mounted article 140 and the passageway 310 is imminent, and allow the driver to operate the vehicle 200 to avoid this collision. In some embodiments, the system 100 may generate and send a message to a collision avoidance system when the maximum vehicle height $H_1$ of the vehicle 200 differs from the clearance height $C_1$ by less than a threshold amount. In response to receiving such a message, the collision avoidance system may adjust one or more vehicle functions or systems. Further, in embodiments in which the vehicle 200 comprises an autonomous vehicle 200, the system 100 may generate and send a message to one or more autonomous vehicle control systems (e.g., an autonomous vehicle drive assembly, an autonomous vehicle steering assembly, or the like) when the maximum vehicle height $H_1$ of the vehicle 200 differs from the clearance height $C_1$ by less than a threshold amount.

Method of Providing Navigation Assistance to a Vehicle

Referring still to FIGS. 1 and 2, a method of providing navigation assistance to the vehicle 200 is also contemplated. The method of providing navigation assistance to the vehicle 200 may be implemented as logic within the machine readable instructions that, when executed by the one or more processors 102, automatically provides navigation assistance to the vehicle 200. It is noted that, while the method is described as following a specific sequence, additional embodiments of the present disclosure are not limited to any particular sequence.

Referring still to FIGS. 1 and 2, during operation of the method of providing navigation assistance to the vehicle 200, the system 100 determines the location of the vehicle 200 using any of the methods described above. In embodiments in which a vehicle mounted article 140 is mounted to the vehicle 200, the system 100 determines the presence of one or more vehicle mounted articles 140 on the vehicle 200, using any of the methods described above.

The system 100 determines the maximum vehicle height $H_1$ of the vehicle 200 using any of the methods described above (e.g., by determining the maximum vehicle height $H_1$ when a vehicle mounted article 140 is present as described above or by determining the maximum vehicle height $H_1$ of the vehicle alone when no vehicle mounted article 140 present as described above). Next, the system 100 determines if the vehicle 200 is proximate the structure 300 having the passageway 310, using any of the methods described above.

Referring still to FIGS. 1 and 2, in response to the presence of the vehicle mounted article 140 and/or the determination of the maximum vehicle height $H_1$ of the vehicle 200 and the proximity of the vehicle 200 to the structure 300, the system 100 may provide navigation assistance to the vehicle 200. In some embodiments, the navigation assistance includes a recommendation of one or more structures 300 having passageways 310 with clearance heights $C_1$ that are greater than the maximum vehicle height $H_1$ of the vehicle 200. In some embodiments, the navigation assistance is presented to the driver visually, on the display 108, audibly though the speakers 120, or a combination thereof.

In some embodiments, the navigation assistance includes providing a route from the present location of the vehicle 200 to a location of one or more structures 300 having passageways 310 with clearance heights $C_1$ that are greater than the maximum vehicle height $H_1$ of the vehicle 200, such as, for example, a nearest structure 300 having a passageway 310 with a clearance height $C_1$ that is greater than the maximum vehicle height $H_1$ of the vehicle 200. The route may include, for example, turn-by-turn directions provided to the system 100, the vehicle 200, and/or the user visually, on the display 108, audibly, through the speakers 120, or a combination thereof. In some embodiments, navigation assistance includes a recommendation of a parking garage with an entrance having a clearance height $C_1$ that is high enough that the vehicle 200 having a maximum vehicle height $H_1$ can enter without contact between the vehicle 200 and/or the vehicle mounted article 140 and the entrance. In some embodiments, the recommendation includes a route to the parking garage. In some embodiments, navigation assistance further includes identifying an area (e.g., a floor, a zone, and/or another portion of the parking garage) of the parking garage that can accommodate the vehicle 200. In each of these embodiments, the navigation assistance may be provided to the driver visually, on the display 108, audibly, though the speakers 120, or a combination thereof. The navigation assistance may provide the driver of the vehicle 200 one or more locations that the vehicle 200 may be driven or parked without a collision between the vehicle 200 and/or the vehicle mounted article 140 with one or more passageways 310 of the one or more structures 300.

In some embodiments, the navigation assistance includes navigating the vehicle 200. In particular, in embodiments in which the vehicle 200 is an autonomous vehicle 200, the navigation assistance includes the autonomous vehicle 200 selecting a location, for example, a location of one or more structures 300 having passageways 310 with clearance heights $C_1$ that are greater than the maximum vehicle height $H_1$ of the autonomous vehicle 200 and navigating the autonomous vehicle 200 to this location. In some embodiments, the autonomous vehicle 200 comprises an autonomous vehicle control system, an autonomous vehicle drive assembly (e.g. a motor), and an autonomous vehicle steering assembly. In operation, the navigation assistance includes actuating the autonomous vehicle drive assembly to propel the autonomous vehicle 200 and actuating the autonomous vehicle steering assembly to steer the autonomous vehicle 200. For example, the autonomous vehicle 200 may navigate to a parking garage with an entrance having a clearance height $C_1$ that is greater than the maximum vehicle height $H_1$ of the autonomous vehicle 200.

It should be understood that embodiments described herein provide for systems and vehicles for altering one or more vehicle functions based on a determination that one or more vehicle mounted articles are present on a roof of a vehicle. This may include altering the functionality of a moveable roof member, providing a notification pertaining to the vehicle mounted article, and/or providing navigation assistance based, in part, on the determination that the vehicle mounted article is present on the roof of the vehicle. The systems and methods may help to prevent the vehicle mounted article from contacting the moveable roof member and/or one or more structures. This may help prevent damage to the vehicle mounted article and the vehicle.

Moreover, the systems and methods described herein may be incorporated in an autonomous vehicle.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a roof;
   a movable roof member movably coupled to the roof;
   one or more processors communicatively coupled to the movable roof member;
   one or more memory modules communicatively coupled to the one or more processors; and
   machine readable instructions stored in the one or more memory modules that cause the vehicle to perform at least the following when executed by the one or more processors:
      determine a presence of a roof mounted article on the roof; and
      disable at least one movable roof member function of the movable roof member in response to determining the presence of the roof mounted article on the roof.

2. The vehicle of claim 1, wherein the vehicle comprises an autonomous vehicle.

3. The vehicle of claim 2, further comprising an autonomous vehicle drive assembly communicatively coupled to the one or more processors, wherein the machine readable instructions stored in the one or more memory modules further cause the autonomous vehicle to perform at least the following when executed by the one or more processors:
   actuate the autonomous vehicle drive assembly to propel the autonomous vehicle.

4. The vehicle of claim 2, further comprising an autonomous vehicle steering assembly communicatively coupled to the one or more processors, wherein the machine readable instructions stored in the one or more memory modules further cause the autonomous vehicle to perform at least the following when executed by the one or more processors:
   actuate the autonomous vehicle steering assembly to steer the autonomous vehicle.

5. The vehicle of claim 1, further comprising one or more sensing devices communicatively coupled to the one or more processors, wherein the machine readable instructions stored in the one or more memory modules further cause the vehicle to perform at least the following when executed by the one or more processors:
   determine a presence of the roof mounted article on the roof based on an output from the one or more sensing devices.

6. The vehicle of claim 1, further comprising network interface hardware communicatively coupled to the one or more processors, wherein the machine readable instructions stored in the one or more memory modules further cause the vehicle to perform at least the following when executed by the one or more processors:
   determine a presence of the roof mounted article on the roof based on communication received by the network interface hardware from the roof mounted article.

7. The vehicle of claim 1, further comprising tactile input hardware communicatively coupled to the one or more processors, wherein the machine readable instructions stored in the one or more memory modules further cause the vehicle to perform at least the following when executed by the one or more processors:

determine a presence of the roof mounted article on the roof based on tactile input received on the tactile input hardware.

8. The vehicle of claim 1, further comprising:
a speaker communicatively coupled to the one or more processors; and
a display communicatively coupled to the one or more processors, wherein when the roof mounted article is positioned on the roof of the vehicle the speaker, the display, or both the speaker and the display output a signal regarding a presence of the roof mounted article.

9. A method for providing a notification pertaining to a vehicle, the method comprising:
receiving a signal from one or more global positioning system satellites using a satellite antenna communicatively coupled to one or more processors;
transforming the signal into a location of the vehicle using the one or more processors and machine readable instructions stored in one or more memory modules communicatively coupled to the one or more processors;
determining a presence of a vehicle mounted article on the vehicle;
determining that the vehicle is proximate a structure having a passageway, wherein the passageway includes a clearance height; and
generating a notification pertaining to the vehicle mounted article.

10. The method of claim 9, wherein the notification pertaining to the vehicle mounted article is an audible notification provided though a speaker, a visual notification provided on a display, or a combination thereof.

11. The method of claim 9, further comprising:
determining a maximum height of the vehicle with the vehicle mounted article; and
generating the notification pertaining to the vehicle mounted article when the maximum height of the vehicle with the vehicle mounted article differs from the clearance height by less than a threshold amount.

12. The method of claim 9, wherein the vehicle comprises an autonomous vehicle and the autonomous vehicle comprises an autonomous vehicle drive assembly and an autonomous vehicle steering assembly.

13. The method of claim 12, further comprising:
actuating the autonomous vehicle drive assembly to propel the autonomous vehicle; and
actuating the autonomous vehicle steering assembly to steer the autonomous vehicle.

14. The method of claim 12, further comprising:
determining a maximum height of the autonomous vehicle with the vehicle mounted article; and
generating the notification receivable by the autonomous vehicle pertaining to the vehicle mounted article when the maximum height of the autonomous vehicle with the vehicle mounted article differs from the clearance height by less than a threshold amount.

15. A method for providing navigation assistance to a vehicle, the method comprising:
receiving a signal from one or more global positioning system satellites using a satellite antenna communicatively coupled to one or more processors;
transforming the signal into a location of the vehicle using the one or more processors and machine readable instructions stored in one or more memory modules communicatively coupled to the one or more processors;
determining a presence of a vehicle mounted article on the vehicle; and
providing navigation assistance based on the determination that the vehicle mounted article is present on the vehicle.

16. The method of claim 15, wherein the vehicle comprises an autonomous vehicle and the navigation assistance comprises navigating the autonomous vehicle based on the determination that the vehicle mounted article is present on the autonomous vehicle.

17. The method of claim 15, wherein the vehicle comprises an autonomous vehicle and the navigation assistance comprises the autonomous vehicle selecting a location having a passageway with a clearance height larger than the than a maximum height of the autonomous vehicle with the vehicle mounted article and navigating the autonomous vehicle to the location selected by the autonomous vehicle.

18. The method of claim 17, wherein navigating the autonomous vehicle to the location selected by the autonomous vehicle comprises:
actuating an autonomous vehicle drive assembly to propel the autonomous vehicle; and
actuating an autonomous vehicle steering assembly to steer the autonomous vehicle.

19. The method of claim 15, wherein the navigation assistance comprises recommending a parking garage having a passageway with a clearance height larger than a maximum height of the vehicle with the vehicle mounted article.

20. The method of claim 19, wherein the navigation assistance comprises identifying an area of the parking garage that can accommodate the vehicle with the vehicle mounted article.

* * * * *